United States Patent [19]

Chaney

[11] Patent Number: 5,546,977
[45] Date of Patent: Aug. 20, 1996

[54] DUAL CONTAINMENT VALVE SYSTEM

[75] Inventor: David A. Chaney, Catoosa, Okla.

[73] Assignee: Conley Corporation, Tulsa, Okla.

[21] Appl. No.: 207,945

[22] Filed: Mar. 8, 1994

[51] Int. Cl.⁶ .............................. G01M 3/08; F16K 43/00
[52] U.S. Cl. ........................... 137/312; 73/40.5 R; 73/46; 137/315; 137/382; 137/527; 251/331
[58] Field of Search ................... 137/312, 315, 137/377, 382, 375, 527, 527.8; 251/298, 331; 73/40.5 R, 46

[56] References Cited

U.S. PATENT DOCUMENTS

| | | | |
|---|---|---|---|
| 1,371,632 | 3/1921 | Latimer | 285/133.1 |
| 1,383,680 | 7/1921 | Waldorf | 138/148 |
| 2,031,849 | 5/1930 | O'Leary | 285/138 |
| 2,613,166 | 10/1952 | Gronemeyer | 138/147 |
| 4,508,139 | 4/1985 | Teumer | 137/315 |
| 4,606,368 | 8/1986 | McCafferty | 137/315 |
| 4,681,133 | 7/1987 | Weston | 137/315 |
| 4,867,201 | 9/1989 | Carter | 251/331 |
| 4,921,003 | 5/1990 | Horvei | 137/315 |
| 4,976,366 | 12/1990 | Russell | 137/375 |
| 5,129,417 | 7/1992 | Dupont et al. | 137/315 |
| 5,143,112 | 9/1992 | Scaramucci | 137/315 |
| 5,228,472 | 7/1993 | Ougiya et al. | 137/312 |

*Primary Examiner*—George L. Walton
*Attorney, Agent, or Firm*—Head, Johnson & Kachigian

[57] ABSTRACT

An integral dual containment valve system for dual containment piping having inner carrier pipes for fluid and outer carrier pipes. The dual containment valve system includes an inner carrier housing connectable to the inner carrier pipes. A valve controls flow of fluid through the inner carrier housing. An outer containment housing surrounds the inner carrier housing and surrounds the valve. The outer containment housing connects to the outer containment pipes. The outer containment housing provides sealable access to the valve.

11 Claims, 4 Drawing Sheets

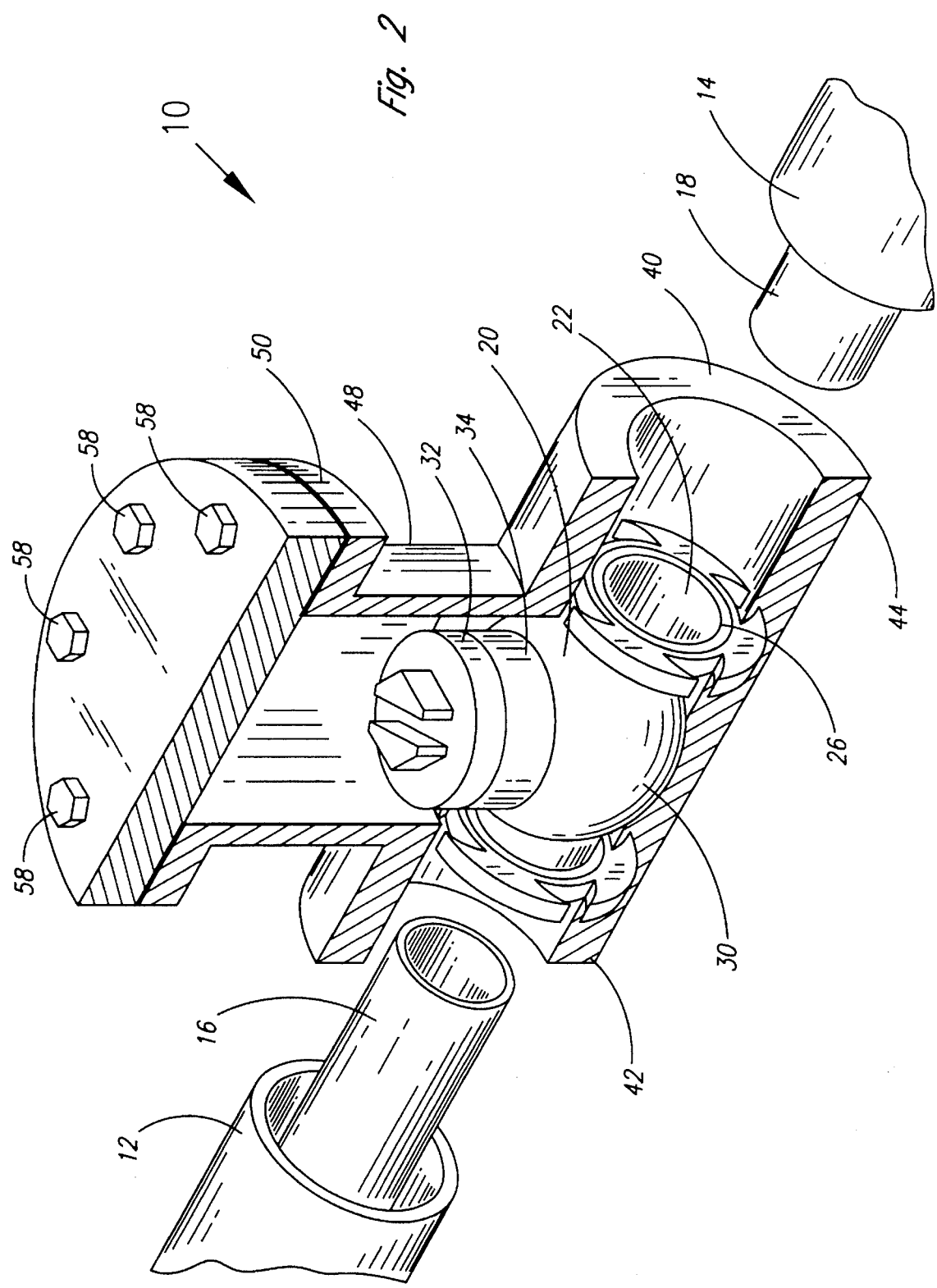

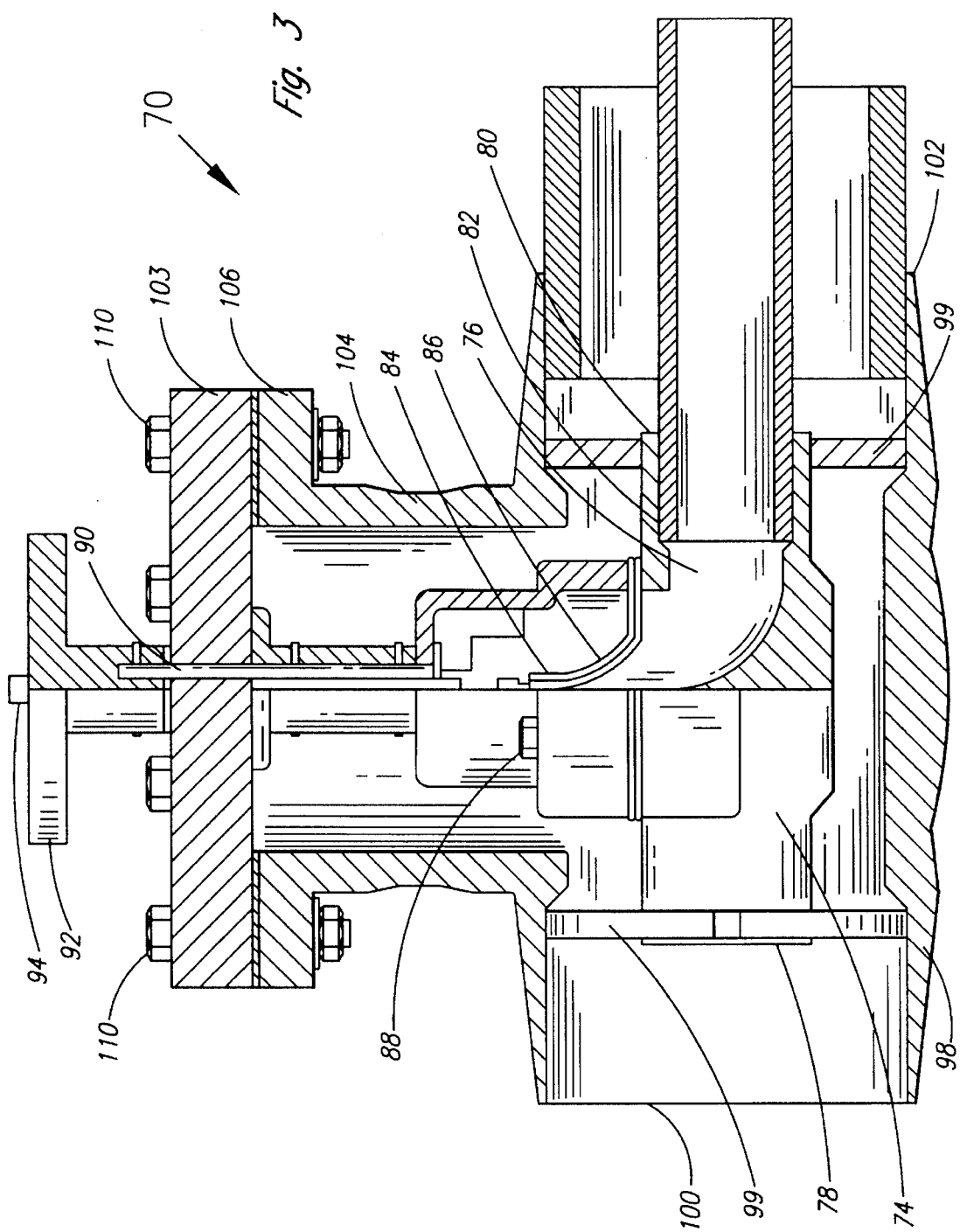

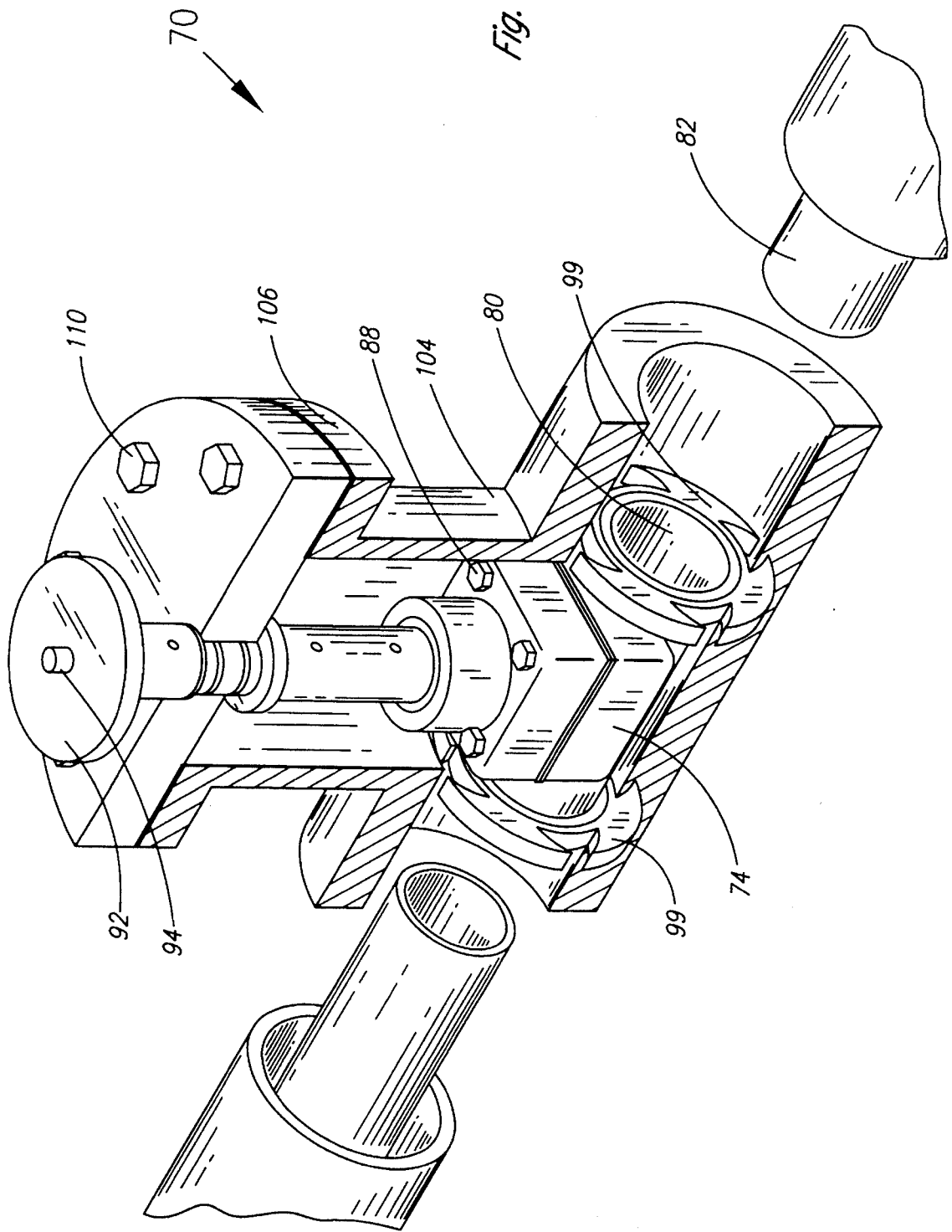

5,546,977

DUAL CONTAINMENT VALVE SYSTEM

BACKGROUND OF THE INVENTION

1. Field of the Invention

The present invention relates to a valve system for dual containment piping systems for fluids. In particular, the present invention relates to a dual containment valve system in an integral, one-piece unit which allows simple and easy installation and accessibility.

2. Prior Art

Double containment piping systems have become common in the chemical processing industries and others. A series of inner containment pipes are used to transport fluid therethrough. Concentric, outer containment pipes surround the inner containment pipes and contain and seal off any leakage from the carrier pipes. The containment pipe may also include drainage systems and leak detectors so that leaks from the carrier pipe may be attended to. In the past, when control of the fluid within the inner carrier pipe was called for, a standard valve or valves were installed in the carrier pipe line. Thereafter, a housing manhole or other box structure was constructed around the valve and around a break in the containment pipe. The structure would have a door or other access means for repair, service or control of the valve.

While this may achieve the intended purpose of leak containment, it does not comport with the leak detection systems in the containment pipe and may not be compatible with conventional hangers, anchors and pipe supports.

There exists a need for a one-piece integral dual containment valve system which may be installed and connected to both the carrier pipes and containment pipes.

Accordingly, it is a principal object and purpose of the present invention to provide a one-piece integral dual containment valve system for a double containment fluid system.

SUMMARY OF THE INVENTION

The present invention provides a dual containment valve system for dual containment piping having outer containment pipes and concentric inner containment pipes.

An inner carrier housing has a passageway that terminates in a pair of opposed open-end sockets. A carrier pipe connects with each open end. A valve mechanism controls flow of fluid through the inner carrier housing. Access to the interior of the valve is provided through a removable cap.

An outer containment housing completely surrounds and is spaced from the inner carrier housing. A spacer or spacers maintain the inner carrier housing concentric with the outer containment housing. The outer containment housing includes a pair of opposed open end sockets. A containment pipe is received within each open end socket. Accordingly, a fluid-tight passage is provided between the outer containment pipes and the outer containment housing.

Extending from the outer containment housing is a tubular extension in angular relation to the axis of passage through the containment housing. The tubular extension terminates in a flanged open top. A containment lid mates with the flanged open top to seal the tubular extension to create a fluid-tight seal. The threaded opening of the valve mechanism is aligned with the flanged open top so that the valve is readily accessible. In order to gain direct access to the valve mechanism for maintenance repair or placement, the containment lid is removed.

BRIEF DESCRIPTION OF THE DRAWINGS

FIG. 2 is a perspective view of the dual containment valve system of the present invention partially cut-away showing inner carrier pipes and outer containment pipes exploded therefrom;

FIG. 3 is a plan view of an alternate embodiment of the dual containment system of the present invention, partially cut-away for clarity; and FIG. 4 is a perspective view of the dual containment system shown in FIG. 3 with the inner carrier pipe and outer containment pipe exploded therefrom.

DETAILED DESCRIPTION OF THE PREFERRED EMBODIMENT

Figure 1:
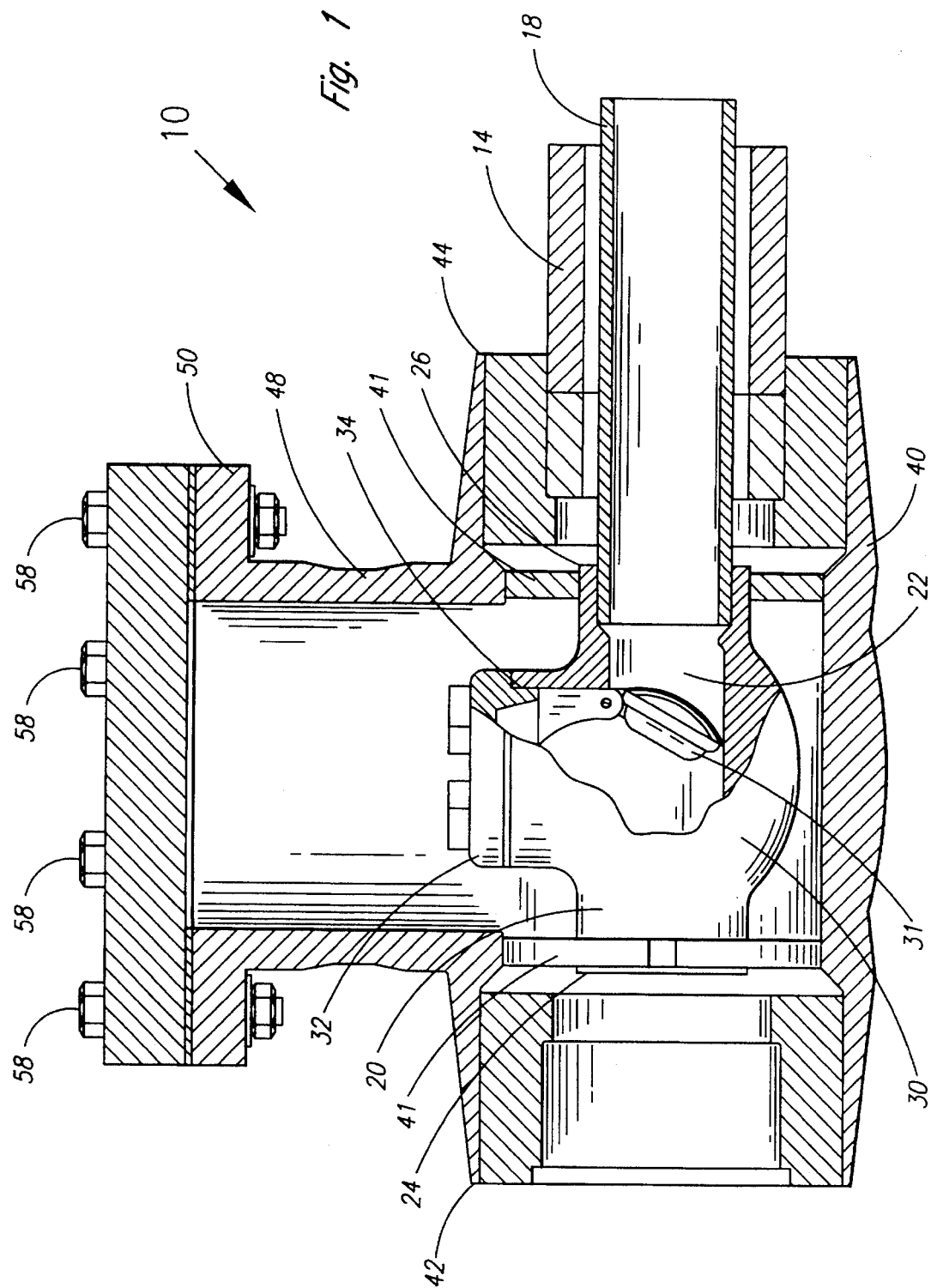
FIG. 1 is a plan view of a dual containment valve system constructed in accordance with the present invention, partially cut-away for clarity.

Referring to the drawings in detail, FIGS. 1 and 2 illustrate one embodiment of the present invention incorporating a swing check valve mechanism. FIG. 1 illustrates a plan view of the dual containment valve system 10 partially sectioned for clarity. FIG. 2 illustrates a sectional view in perspective with adjacent outer containment pipes 12 and 14 and adjacent inner carrier pipes 16 and 18 exploded therefrom.

In a typical dual containment piping arrangement, a number of inner carrier pipes such as 16 and 18 are arranged and connected end-to-end to transport fluid therethrough. A series of concentric outer containment pipes such as those shown at pipes 12 and 14 surround the inner carrier pipe and are concentric therewith. The outer containment pipes form a fluid tight seal around the carrier pipes. As is well known any leakage from the inner carrier pipes will be trapped in the outer containment pipe. Spacers (not shown) may be used to keep the pipes in concentric alignment.

An inner carrier housing 20 has a passageway 22 (seen in FIG. 2). The passageway terminates in a pair of opposed open end sockets 24 and 26.

Carrier pipe 18 connects with open end socket 26 while carrier pipe 16 connects with open end socket 24.

A valve mechanism 30 controls the flow of fluid through the inner carrier housing. In the embodiment shown in FIGS. 1 and 2, a one way, swing, check valve having a valve plate 31 is provided. Access through the interior of the check valve is provided through a removable cap 32 having external threads which mate with a threaded opening 34.

An outer containment housing 40 completely surrounds the inner carrier housing. A spacer or spacers 41 maintain the inner carrier housing concentric with the outer containment housing. As best seen in FIG. 2, the spacers 41 may have openings or cutaway portions to allow for drainage or leak detection systems in the dual containment piping.

The outer containment housing 40 includes a pair of opposed open end sockets 42 and 44. The outer containment pipe 12 will be received within the open end socket 42 while the outer containment pipe 14 will be received within the open end socket 44. Accordingly, a fluid tight passage is provided between the outer containment pipe 12, the outer containment housing 40, and the outer containment pipe 14.

Extending from the outer containment housing 40 is a tubular extension 48. The tubular extension 48 is in angular relation to the axis of passage through the containment housing. The tubular extension terminates in a flanged open top 50. Containment lid 54 mates with flanged open top 50 to seal the tubular extension and create a fluid tight seal. The containment lid 54 is fastened to the flange by fasteners 58 or other devices.

In order to gain direct access to the check valve for maintenance, repair or replacement, the fasteners 58 may be unfastened and the containment lid 54 thereafter removed. The removable cap 32 may then be unthreaded from the threaded opening 34. The threaded opening 34 is aligned with the flanged open top 50 so that the valve mechanism is readily accessible. In order to replace the valve mechanism, the opposite procedure is performed.

FIG. 3 illustrates an alternate embodiment of the present invention 70. FIG. 3 illustrates a plan, sectional view of the dual containment valve system 70 while FIG. 4 illustrates a sectional view in perspective.

An inner carrier housing 74 has a passage way 76 (seen in the quarter sectional portion). The passage way 76 terminates in a pair of opposed open end sockets 78 and 80. The open ends include a shoulder for receipt of one end of a carrier pipe. A weir pinch-action diaphragm valve 84 includes a rubber diaphragm 86 which is movable to open or close the passageway 76. The valve mechanism 84, thus, controls the flow of fluid through the inner carrier housing 74.

The valve mechanism 84 may include bolts 88 or other fasteners to seal the valve or provide access to the interior of the valve 84 and diaphragm 86.

Rotation of the handle 92 rotates the stem 90 which, in turn, moves the rubber diaphragm 86. An indicating stem button 94 visually indicates whether the valve is open or shut. When the button is in the "up" position as shown in FIG. 3, the valve is open. In contrast, when the indicating button is flush with the handle, the valve is closed.

An outer containment housing 98 completely surrounds and is spaced from the inner carrier housing 74. A spacer or spacers 99 maintain the inner carrier housing concentric with the outer containment housing. As best seen in FIG. 4, the spacers 99 may have openings or cut-away portions to allow for drainage or leak detection systems in the dual containment piping.

The outer containment housing 98 includes a pair of opposed open end sockets 100 and 102. The outer containment pipes 12 and 14 will be received within the open end sockets 100 and 102. Accordingly, a fluid tight passage is provided between the outer containment pipes 12 and 14 and the outer containment housing 98. Extending outward from the outer containment housing 98 is a tubular extension 104. The tubular extension 104 is in angular relation to the axis of passage through the containment housing. The entire outer containment housing 98 including the tubular extension 104 may have a corrosion resistant inner liner. The tubular extension 104 terminates in an open end having an extending flange 106. A containment lid 108 mates with flanged open end 106 in order to seal the tubular extension 104 and create a fluid tight seal.

Elastomeric seals 105 both above and below the containment lid assist in sealing in the contained area. Additionally, an elastomeric seal 107 between the bonnet and the stem 90 maintain a fluid-tight seal.

The containment lid 108 has a central opening therethrough (not visible in FIG. 3) to allow the stem 90 to pass therethrough. O-ring shaft seals 109 maintain a seal between containment lid and the stem. The containment lid 108 is fastened to the flange 106 by fasteners 110 or other devices.

Returning to a consideration of FIG. 1, either embodiment may include a reducer insert, such as at 120 and 122, which is receivable in the open end sockets of the containment housing. Accordingly, the diameter of the open end socket may be varied. As an example, the containment housing may receive either 4" diameter or 6" diameter containment pipe.

The valve systems of the present invention may be made of any corrosion-resistant material, such as a filament wound thermosetting resin.

Whereas, the present invention has been described in relation to the drawings attached hereto, it should be understood that other and further modifications, apart from those shown or suggested herein, may be made within the spirit and scope of this invention.

What is claimed is:

1. An integral dual containment valve system for dual containment piping having inner carrier pipes for fluid and outer containment pipes, which dual containment valve system comprises:

an inner carrier housing having means to connect said inner carrier pipes thereto;

valve means to control flow of fluid through said inner carrier housing;

an outer containment housing surrounding said inner carrier housing having means to connect said outer containment pipes to said outer containment housing;

said outer containment housing having sealable access means to access said valve means to allow repair, maintenance and replacement of said valve means without disassembling said outer containment housing; and a plurality of spacers mounted between said carrier housing and said containment housing and said outer flow fluid drainage between said outer containment housing and said outer containment pipes, said spacers concentric with said inner carrier pipes and said outer containment pipes, and said spacers supportingly receiving said inner carrier housing within said outer containment housing.

2. An integral dual containment valve system as set forth in claim 1 wherein each said spacer has openings therethrough for drainage and leak detection means.

3. An integral dual containment valve system as set forth in claim 1 wherein said means to connect said inner carrier pipe includes a pair of opposed sockets to receive said inner carrier pipes therein and to form a fluid-tight connection.

4. An integral dual containment valve as set forth in claim 1 wherein said valve means is aligned with said sealable access means.

5. An integral dual containment valve system as set forth in claim 1 wherein said valve means includes a check valve.

6. An integral dual containment valve system as set forth in claim 5 wherein said check valve includes a removable cap for access to said check valve.

7. An integral dual containment valve system as set forth in claim 1 wherein said valve means includes a weir type diaphragm valve.

8. An integral dual containment valve system as set forth in claim 7 including stem assembly means extending from said diaphragm valve and extending through said sealable access means.

9. An integral dual containment valve system as set forth in claim 1 wherein said means to connect said outer containment pipes to said outer containment housing includes a pair of opposed sockets to receive said outer containment pipes therein and to form a fluid-tight connection.

10. An integral dual containment valve system as set forth in claim 9 including a reducer receivable in said socket for reducing the diameter of said socket.

11. An integral dual containment valve system as set forth in claim 1 wherein said sealable access means includes a containment lid removably secured to said outer containment housing by a plurality of fasteners.

\* \* \* \* \*